US011108886B2

(12) United States Patent
Bradley et al.

(10) Patent No.: US 11,108,886 B2
(45) Date of Patent: Aug. 31, 2021

(54) REMOTE PROVISIONING AND ENROLLMENT OF ENTERPRISE DEVICES WITH ON-PREMISES DOMAIN CONTROLLERS

(71) Applicant: AirWatch LLC, Atlanta, GA (US)

(72) Inventors: Chase Bradley, Atlanta, GA (US); Kevin Jones, Atlanta, GA (US)

(73) Assignee: AIRWATCH, LLC, Atlanta, GA (US)

( * ) Notice: Subject to any disclaimer, the term of this patent is extended or adjusted under 35 U.S.C. 154(b) by 0 days.

(21) Appl. No.: 16/911,966

(22) Filed: Jun. 25, 2020

(65) Prior Publication Data

US 2020/0329121 A1  Oct. 15, 2020

Related U.S. Application Data

(60) Division of application No. 15/972,457, filed on May 7, 2018, now Pat. No. 10,735,558, which is a
(Continued)

(51) Int. Cl.
*H04L 29/08* (2006.01)
*H04L 12/46* (2006.01)
(Continued)

(52) U.S. Cl.
CPC .......... *H04L 67/34* (2013.01); *H04L 12/4633* (2013.01); *H04L 12/4641* (2013.01);
(Continued)

(58) Field of Classification Search
CPC ................ H04L 67/34; H04L 12/4633; H04L 12/4641; H04L 41/046; H04L 41/0806;
(Continued)

(56) References Cited

U.S. PATENT DOCUMENTS 9,608,810 B1 * 3/2017 Ghetti .................. H04L 63/102
9,894,099 B1 * 2/2018 Jacobsen ................ H04L 63/20
(Continued)

OTHER PUBLICATIONS

Dietiker, Kristen, "Managing IOS Mobile Devices", SIGUCCS '11: Proceedings of the 39th annual ACM SIGUCCS conference on User services; Nov. 2011; pp. 49-52; https://doi.org/10.1145/2070364.2070378 (Year: 2011).*
(Continued)

*Primary Examiner* — Jerry B Dennison
(74) *Attorney, Agent, or Firm* — Thomas Horstemeyer, LLP

(57) ABSTRACT

An agent application executing on a client device retrieves an execute command from a command queue managed by a server and retrieves certificates and configuration settings for establishing a virtual private network (VPN) connection. An enrollment application resident on the client device executes in response to the execute command to modify a network setting of a network interface card (NIC) of the client device and establish a VPN connection with a domain controller located within the corporate domain using the certificate and configuration settings. The enrollment application further transmits a request over the VPN connection to the domain controller to join the corporate domain, wherein a corporate account in a directory service is established for the client device; reverts back to the prior network setting of the NIC and terminates the VPN connection and reboots the client device.

17 Claims, 4 Drawing Sheets

Related U.S. Application Data continuation of application No. 15/186,069, filed on Jun. 17, 2016, now Pat. No. 10,003,670.

(51) Int. Cl.
| | |
|---|---|
| *H04L 12/24* | (2006.01) |
| *H04L 29/12* | (2006.01) |
| *H04L 29/06* | (2006.01) |
| *H04W 12/06* | (2021.01) |
| *H04W 12/30* | (2021.01) |

(52) U.S. Cl.
CPC ........ *H04L 41/046* (2013.01); *H04L 41/0806* (2013.01); *H04L 41/0816* (2013.01); *H04L 61/1511* (2013.01); *H04L 63/0272* (2013.01); *H04L 63/0823* (2013.01); *H04L 67/306* (2013.01); *H04L 67/42* (2013.01); *H04W 12/06* (2013.01); *H04W 12/35* (2021.01)

(58) Field of Classification Search
CPC ............. H04L 41/0816; H04L 61/1511; H04L 63/0272; H04L 63/0823; H04L 67/306; H04L 67/42; H04W 12/35; H04W 12/06
See application file for complete search history.

(56) References Cited

U.S. PATENT DOCUMENTS

| | | | |
|---|---|---|---|
| 10,003,670 B2* | 6/2018 | Bradley | H04L 41/0816 |
| 10,104,538 B2* | 10/2018 | Gattu | H04L 67/34 |
| 10,165,007 B2* | 12/2018 | Brennan | G06F 21/6245 |
| 10,735,558 B2* | 8/2020 | Bradley | H04L 12/4641 |
| 10,764,393 B2* | 9/2020 | Casassa Mont | H04L 61/2015 |
| 2008/0010125 A1* | 1/2008 | Wright | G06Q 30/0268 705/14.66 |
| 2015/0249617 A1* | 9/2015 | Chang | H04L 67/04 709/225 |
| 2016/0087956 A1* | 3/2016 | Maheshwari | G06F 21/31 726/6 |
| 2016/0094386 A1* | 3/2016 | Kaufman | H04L 41/0869 709/220 |
| 2017/0063857 A1* | 3/2017 | Rykowski | H04L 63/10 |
| 2017/0094509 A1* | 3/2017 | Mistry | H04L 63/0823 |
| 2017/0195332 A1* | 7/2017 | Wu | H04L 67/10 |
| 2017/0366646 A1* | 12/2017 | Bradley | H04L 67/306 |
| 2018/0255158 A1* | 9/2018 | Bradley | H04L 41/0806 |
| 2020/0329121 A1* | 10/2020 | Bradley | H04L 41/0806 |

OTHER PUBLICATIONS

JAMF Software; Casper Suite Administrator's Guide Version 9.73, 2015 (Year: 2015).*

* cited by examiner

REMOTE PROVISIONING AND ENROLLMENT OF ENTERPRISE DEVICES WITH ON-PREMISES DOMAIN CONTROLLERS

CROSS REFERENCE TO RELATED APPLICATIONS

This application is a divisional of copending U.S. patent application Ser. No. 15/972,457, entitled "REMOTE PROVISIONING AND ENROLLMENT OF ENTERPRISE DEVICES WITH ON-PREMISES DOMAIN CONTROLLERS, which is a continuation of U.S. Pat. No. 10,003,670, entitled "REMOTE PROVISIONING AND ENROLLMENT OF ENTERPRISE DEVICES WITH ON-PREMISES DOMAIN CONTROLLERS" and filed on Jun. 17, 2016, which is incorporated by reference as if set forth herein in its entirety.

BACKGROUND

Within the enterprise setting, it is essential for mobile device administrators to control access to such resources as electronic mail, contacts, calendar data, virtual private network (VPNs), and so on. Specifically, administrators must ensure that only authorized users have access to mobile devices as such devices may otherwise allow unauthorized users to gain access to the enterprise network environment. Enterprise administrators of smartphones, tablets, laptops, and other mobile devices therefore incorporate security measures to prevent unauthorized access to sensitive information and enterprise resources.

To reduce the cost of purchasing mobile devices and corresponding service charges, an enterprise further may allow employees to utilize personal mobile devices under a "bring your own device" (BYOD) policy to access enterprise resources. However, in instances where the corporate device is procured directly by the end user, enterprise administrators must provision the client device while the device is physically within the enterprise network (i.e., behind the enterprise firewall) in order to implement various policies that impose certain restrictions on accessing enterprise resources by client devices. As a result, the organization may incur overhead not only in time allocated for provisioning the device but also in shipping costs and delay to the end user.

BRIEF DESCRIPTION OF THE DRAWINGS

Various aspects of the present disclosure can be better understood with reference to the following drawings. The components in the drawings are not necessarily to scale. Emphasis is placed upon clearly illustrating various features of the present disclosure. Moreover, in the drawings, like reference numerals designate corresponding parts throughout the several views.

DETAILED DESCRIPTION

Figure 1:
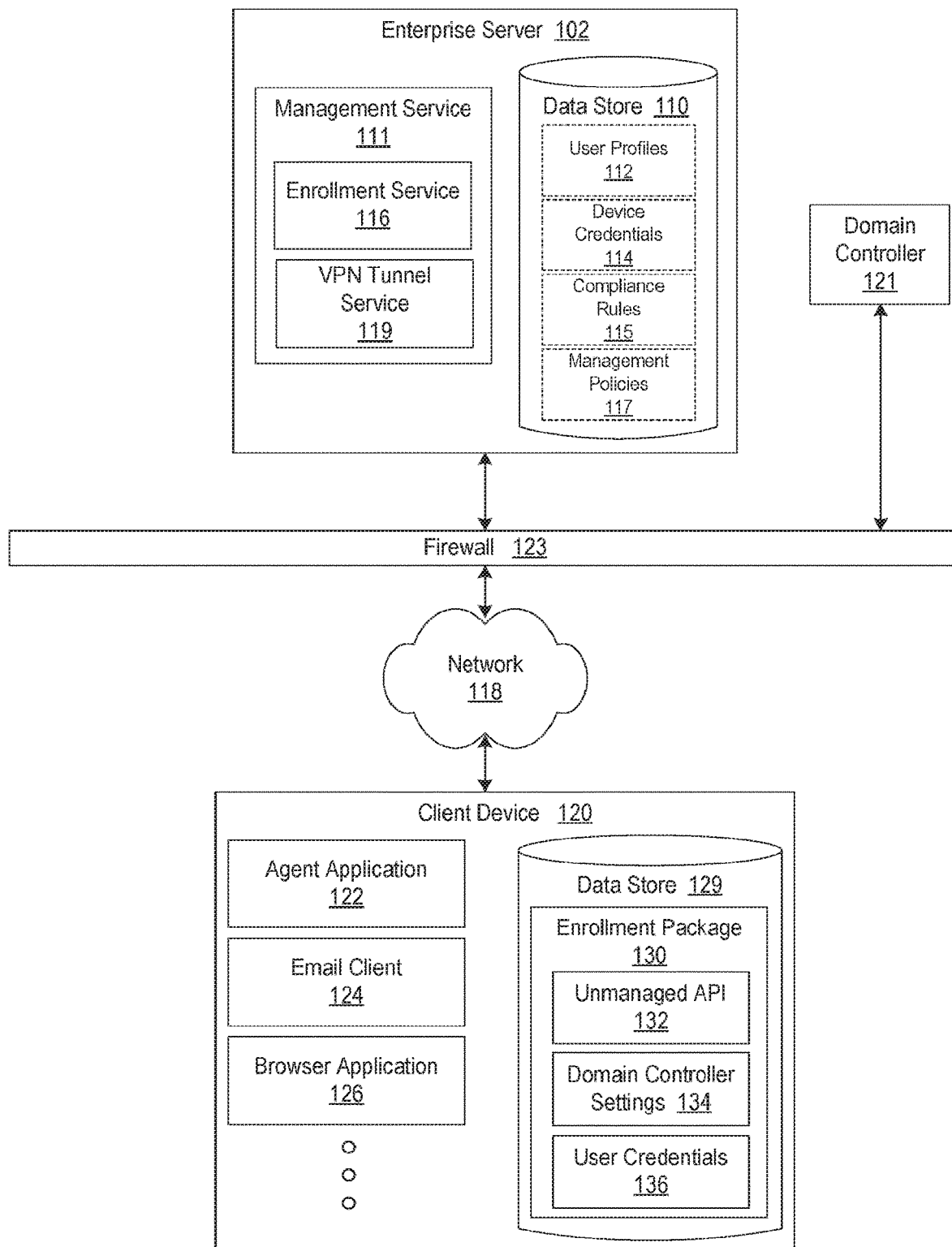
FIG. 1 is a block diagram of a networked environment for remotely provisioning a client device in accordance with various embodiments.

Mobile device users in an enterprise environment may be granted access by administrators to electronic mail and other enterprise resources, thereby allowing users to work remotely. To reduce the cost of purchasing mobile devices and corresponding service charges, an enterprise further may allow employees to utilize personal mobile devices under a "bring your own device" (BYOD) policy to access enterprise resources. Alternatively, the enterprise may allow the employee to directly procure a device designated for corporate use.

Directory services are often deployed in an enterprise computing environment to control who may access particular enterprise resources. Microsoft® Active Directory (AD) is a common example of a directory service. In Microsoft's® Azure Active Directory (AD) platform, users are able to access enterprise resources through a cloud-based directory that provides identity management service. Azure AD provides enterprise administrators with a range of management capabilities, including device registration, password management, group management, and so on. However, Azure AD must be migrated to the cloud, thereby potentially introducing security concerns and changes in the organizations infrastructure. Many organizations prefer to keep their domain controllers physically on premises in order to support third party software integration and other functions. Furthermore, Azure AD is currently only compatible with newer versions of Windows® while older versions of Windows® are still widely deployed in the PC landscape today.

In this regard, remotely staging devices physically outside of the enterprise network and establishing an AD account is not supported natively in some operating systems. Thus, enterprise administrators must provision the client device while the client device is physically connected to the enterprise network that is part of the AD domain. This restricts enterprise administrators from being able to stage client devices outside of the enterprise network, which is critical for organizations that wish to incorporate a BYOD policy. Furthermore, enterprise administrators must set up client devices for the end user's AD account on the enterprise network. Once the client device has been set up on the domain, the user cannot log into the client device unless the user logs into the client device while physically connected to the enterprise network within the domain.

This limitation restricts enterprise administrators from being able to simply ship a provisioned client device to a remote end user until their account has been properly added. As a result, the organization may incur overhead not only in time allocated for provisioning the device but also in shipping costs and delay to the end user. Finally, if a provisioned client device does not join the domain (in the Windows® operating system, this typically means locally joined due to constraints with VPN and Windows networking policy) on a regular basis, the client device will lose connectivity and lock the user out. Furthermore, if the client device is not routinely checking in with the domain, any usage policies restricting usage of the client device cannot be updated without connecting to the domain.

The present disclosure relates to remote provisioning and enrollment of client devices through the use of a tunnel component and adding the client devices to the enterprise domain. A technical effect of the present disclosure is the ability for enterprise administrators to remotely stage new client devices through the use of low level machine code without the requiring end users to physically bring new (or personally owned) client devices to the enterprise administrator and inconveniencing the end users.

A description of a system for implementing remote data securement is now described followed by a discussion of the operation of the components within the system. FIG. 1 is a networked environment 100 that includes a server 102 and a client device 120 communicatively coupled over a network 118. The network 118 includes, for example, the Internet, one or more intranets, extranets, wide area networks (WANs), local area networks (LANs), wired networks, wireless networks, other suitable networks, or any combination of two or more such networks. For example, the networks can include satellite networks, cable networks, Ethernet networks, and other types of networks.

The server 102 may comprise, for example, a server computer or any other system providing computing capability. Alternatively, the server 102 may employ a plurality of computing devices that may be arranged, for example, in one or more server banks, computer banks or other arrangements. Such computing devices may be located in a single installation or may be distributed among different geographical locations. For example, the server 102 may include a plurality of computing devices that may collectively comprise a hosted computing resource, a grid computing resource and/or any other distributed computing arrangement. In some cases, the server 102 may correspond to an elastic computing resource where the allotted capacity of processing, network, storage, or other computing-related resources may vary over time. The server 102 may also include or correspond to one or more virtualized server instances that are created in order to execute the functionality that is described herein.

The server 102 includes a data store 110 accessible to the server 102, where the data store 110 may be representative of a plurality of data stores. The data stored in the data store 110, for example, is associated with the operation of the various applications and/or functional entities described below that are executed in the server 102. Various components execute on a processor of the server 102 and configure the processor to perform various operations, as described in more detail below.

A management service 111 is executed to monitor and manage the operation of client devices 120 in accordance with enterprise resource policies. In some instances, the management service 111 manages and monitors the operation of client devices 120 enrolled by the management service 111. The management service 111 also provides client devices 120 with access to email, calendar data, contact information, and other enterprise resources.

The management service 111 includes an enrollment service 116 that communicates with a client device 120 during the initial stages of enrollment with the management service 111. In instances where an end user wishes to enroll a personally owned device (e.g., a laptop) or where the end user wishes to enroll a newly acquired device procured directly by the end user, the management service 111 can provide the client device 120 with a uniform resource locator (URL), IP address, or other information that the end user enters, selects, or clicks on to communicate with the enrollment service 116 to initiate enrollment with the management service 111.

The enrollment service 116 also provides the client device 120 with a token that indicates that the client device 120 has been authenticated and that the client device 120 is permitted to communicate and enroll with the management service 111. In some instances, the end user installs an agent application 122 that allows the client device 120 to enroll in an enterprise environment, configure and update device settings over the air, enforce security policies and compliance, secure mobile access to enterprise resources, remotely lock and wipe managed devices, and so on.

The VPN (virtual private network) tunnel service 119 interfaces with the agent application 122 executing on the client device 120 to initiate a temporary system wide VPN connection to allow the client device 120 to access the on-premises domain controller 121 located behind the enterprise firewall 123. The domain controller 121 is a server implemented within the enterprise network that manages security authentication requests for accessing enterprise resources (e.g., enterprise applications, sensitive data) within the corporate domain behind the enterprise firewall 123.

Data describing the state of the client device 120 can specify, for instance, various settings that are applied to the client device 120, applications that are installed on or that are being executed by the client device 120, and files that are installed on or are accessible to the client device 120. Such settings may comprise values (e.g., IP address of a server 102) that enable functionality (e.g., turn on disk encryption) or disable functionality (e.g., require TLS/disable HTTP traffic). In this regard, such settings may comprise configurations or restrictions.

Additionally, the data describing the state of the client device 120 can specify information related to the management of the client device 120 such as the last time the client device 120 provided its state information to the management service 111, whether the client device 120 is in a state of compliance with any applicable compliance rules 115, and whether any remedial actions have been or are to be taken as a result of a noncompliance with any applicable compliance rules 115. With regards to the management of the client device 120, a device record established by the server 102 may specify organizational groups (e.g., sales and marketing, legal) that the client device 120 is a member of. In some implementations, the enterprise administrator may incorporate a static hard coded relationship between the client device 120 and an organizational group. Alternatively, the enterprise administrator may implement a dynamic evaluation of a membership condition associated with an organizational group.

Data describing compliance rules 115 with which the client device 120 must comply can specify, for instance, one or more remedial actions that should be performed in the event that an associated rule condition occurs. Further, data describing management policies 117 can include permissions or access rights of the client device 120 and settings that are being enforced upon the client device 120 for purposes of controlling if, when, and how the client device 120 is permitted to function. In some embodiments, the data describing compliance rules 115 and the data describing management policies 117 are obtained from an organizational record associated with an organizational group to which the client device 120 is a member. For each client device 120, a device record is established and maintained by the server 102, where the compliance rules 115 and management policies 117 associated with the organizational group are reflected in the device record for each member client device 120.

After a new or personally owned client device 120 is added to a directory service of the domain controller 121, the management service 111 associates the client device 120 with an organizational group by storing data in a device record for the client device 120 indicating that the client device 120 is in a particular organizational group. In some instances, associating the client device 120 with the organizational group involves generating or modifying a data structure that represents associations between particular client devices 120 and a particular organizational group. For instance, the server 102 can generate a data structure representing an organizational group.

The data structure can include sub-components having data representing particular client devices 120 and data representing particular compliance rules 115. By virtue of including a sub-component representing a particular client device 120 within a data structure that represents a particular organizational group, the server 102 can indicate that the client device 120 is associated with the organizational group. Also, by virtue of including a sub-component representing a particular compliance rule 115, the server 102 can indicate that the compliance rule 115 is associated with the organizational group. Further, by virtue of including both a sub-component representing a particular client device 120 and a particular compliance rule 115, the server 102 can indicate that the client device 120 must comply with the compliance rule 115 due to their respective associations with the organizational group.

The management service 111 in the server 102 is further configured to maintain a command queue of commands that are designated for execution by the client device 120, where each client device 120 has a corresponding command queue. A client device 120 can be provisioned by the server 102 by causing resources to be installed or stored on the client device 120 through the use of the command queue. To implement such a process, the server 102 places a command related to provisioning in the command queue.

To initiate the remote provisioning procedure described herein, the server 102 stores an enrollment package 130 in the command queue for the client device 120 to obtain and execute locally. For implementations where the enrollment package 130 is already stored locally on the client device 120 (i.e., resident on the client device 120), the server 102 may be configured to store an execute command in the command queue. In this instance, the execute command is retrieved by the client device 120, and the command automatically initiates execution of the enrollment package 130 on the client device 120. Alternatively, the server 102 can store data in the command queue that instructs the client device 120 to retrieve the enrollment package from a third party. Whether a provisioning command or a command related to a remedial action is stored in the command queue, the client device 120 can retrieve commands stored in its assigned command queue through various ways including, for example, a client-server "pull" configuration or a client-server "push" configuration.

The data in the data store 110 of the server 102 includes, for example, user profile data 112, device credential data 114, compliance rules 115, management policies 117, and other data. The user profile data 112 includes data associated with a user account, such as mailbox data, calendar data, contact data, and so on. Device credential data 114 may include resource access settings for each specific client device 120. The device credential data 114 may include, for example, authentication credentials, delegation settings (e.g., information about other users who may be provided access to the user profile data 112 of a particular user), mail and document retention rules and/or policies, and/or other geographic access restrictions or limitations (e.g., information about certain locations and/or networks from which enterprise resources can be accessed). User profile data 112 may also include other account settings, such as biographical or demographic information about a user, password reset information, multi-factor authentication settings, and other data related to a user account.

Compliance rules 115 in the data store 110 of the server 102 represent enterprise resource usage policies established by the administrator where the usage activities associated with the client device 120 must comply with such compliance rules 115 in order to gain access to enterprise resources. If one or more activities of a client device are determined to be non-compliant, escalating remedial actions are performed by the administrator to bring the client device 120 back into compliance. As the nature of the non-compliant activity increases in severity, the corresponding remedial action escalates accordingly. Such escalating remedial actions may be embodied as commands that are stored in a command queue by the administrator using the management console 108 and fetched by the client device 120. In some embodiments, the commands fetched by the client device 120 serve to trigger execution of one or more applications pre-loaded onto the client device 120.

Once a new client device 120 has been remotely provisioned and enrolled by the enterprise administrator, the activities of the client device 120 are tracked by the management service 111. Compliance rules 115 may also be stored on the client device 120, where an agent application 122 reports any violations of compliance rules 115 to the server 102. In this regard, compliance rules 115 can be stored in the data store 110 and/or on the client device 120 and represent requirements with which a user and/or a client device 120 must comply in order to access enterprise resources.

The management service 111 may associate a particular management policy 117 with an organizational group, where a management policy 117 can specify how if, when, and how a client device 120 is authorized to function. A management policy 117 can specify that the client device 120 has such permission by virtue of the client device 120 being associated with an organization group that is associated with the management policy 117. That is, the management policy 117 may be created by an enterprise administrator specifying the permissions without any reference to a particular client device 120. Instead, the management policy 117 can be created and associated with an organizational group, which may, over time, include different client devices 120. In this way, a client device 120 becomes subject to the management policy 117 by virtue of becoming a member of the organizational group.

In one instance, a client device 120 can become a member of or become associated with an organizational group when an administrator of the organizational group specifies that the client device 120 should be a member through a static hard coding. In another instance, a client device 120 can become a member of an organizational group when a membership condition is satisfied through a dynamic evaluation of the membership condition. A membership condition can be created by an administrator of the organizational group by specifying a condition related to the client device 120 that when satisfied, causes the membership of the organizational group to include the client device 120. Conversely, the membership condition can also specify a condition related to the client device 120 that, when not satisfied, causes the membership of the organizational group to exclude the client device 120.

It should also be understood that a client device 120 can become (or cease to be) a member of an organizational group based on the users of the client device 120. In particular, through a static hard coding or an evaluation of a membership condition, a particular individual can be identified for membership within an organizational group. Once that particular individual has been identified as a member of the organizational group, one or more client devices 120 that the particular individual has or is using can become members of the organizational group. In this way, by virtue of a particular individual being a member of an organizational group, all the client devices 120 operated by the particular individual become subject to the management policies 117 and compliance rules 115 associated with the organizational group—thereby controlling if, when, and how such client devices 120 may be operated by the particular individual.

As an example, a particular management policy 117 associated with a particular organizational group can specify that any client device 120 that is associated with the organizational group is prohibited from accessing confidential resources associated with the organizational group. If the management service 111 determines that a client device 120 fails to comply with a particular management policy 117, the management service 111 in the server 102 can remove the client device 120 from the membership of the organizational group, which further causes the client device 120 to no longer be prohibited from accessing the confidential resources associated with the organizational group (assuming that the client device 120 is otherwise authorized to access the confidential resources).

The management service 111 can associate a management policy 117 with a compliance rule 115. A compliance rule 115 can specify a rule condition and an action that should be taken by the management service 111 if it is determined that the rule condition has occurred (i.e., a remedial action). In some embodiments, a rule condition of a compliance rule 115 can reflect the specifications of a management policy 117. For example, a compliance rule 115 can include a rule condition for an attempt by a member of a particular organizational group to access confidential resources associated with the organizational group.

As another example, a compliance rule 115 may specify that a client device 120 must periodically connect to the server 102 provide the management service 111 with status updates according to a predetermined time interval in order to access enterprise resources. Another example of a compliance rule 115 may comprise a requirement that an operating system of the client device 120 be left unmodified with respect to root access or superuser privileges available to the user as certain users may otherwise attempt to remove applications (e.g., agent application 122) from the client device in order to prevent monitoring by the server 102. Another compliance rule 115 may prohibit attempts to gain unauthorized access to restricted access storage on the client device 120. For example, the hard drive of the client device 120 may be encrypted using Microsoft® BitLocker®. Any unauthorized attempts to circumvent the BitLocker® encryption would constitute a non-compliant activity on the client device 120.

One or more remedial actions may be applied where the remedial actions are ordered by assumed likelihood. For example, where the operating system of the client device 120 has been modified, the remedial actions may comprise notifying the user of the client device 120 of non-compliance and/or any duration until further remedial action will be taken, performing an enterprise wipe (wiping enterprise-related content from the client device 120 without affecting personal content on the client device 120), locking or blocking local or remote services by uninstalling profiles on the client device 120 that allow the client device 120 to use the services, by instructing a gateway service to block traffic, or by instructing remote services to stop serving the client device 120. Other remedial actions may include a full client device 120 wipe as described herein, and un-enrolling the client device 120 by removing a device management profile and/or agent from the client device 120, and/or by removing a device management record from the server 102.

Another compliance rule 115 may prohibit certain unauthorized application (e.g., malware) from being installed onto the client device 120. Remedial actions corresponding to this compliance rule 115 may include notifying the user of the client device 120 of non-compliance and/or notifying the user that an authorized version of the application is available, and/or notifying the user of a duration until further remedial action will be taken. Other remedial actions corresponding to this compliance rule 115 may include removing the application from the client device 120, installing an authorized version of the application onto the client device 120, and performing an enterprise wipe on the client device 120.

Another compliance rule 115 may prohibit removal of enterprise applications (e.g., agent application 122) from the client device 120. Remedial actions corresponding to this compliance rule 115 may include notifying the user of the client device 120 of non-compliance and/or providing the user with information on how to re-enroll the client device 120. Other remedial actions corresponding to this compliance rule 115 may include forcing re-installation of the application (e.g., agent application 122) on the client device 120, and performing an enterprise wipe on the client device 120.

Another compliance rule 115 may relate to invalid credential being provided by the user or credentials failing to meet security requirements. Remedial actions corresponding to this compliance rule 115 may include locking the client device 120, blocking access to local or remote services, performing an enterprise wipe on the client device 120, performing a full client device 120 wipe, and un-enrolling the client device 120.

Compliance rules 115 are thus configured to recognize attempts to thwart a related management policy 117. Continuing with the example, the compliance rule 115 can specify that access to a client device 120 from which the access attempt was made should be locked (i.e., the remedial action). In the event that the server 102 determines that the rule condition of the compliance rule 115 has been triggered, the server 102 can cause the remedial action of the compliance rule 115 to be performed or enforced.

The client device 120 in FIG. 1 may be embodied as a processor-based system such as a desktop computer, a laptop computer, a smartphone, a tablet computer system, and so on. The client device 120 includes a display that comprises, for example, one or more devices such as liquid crystal display (LCD) displays or other types of display devices. The client device 120 is equipped with networking capability or networking interfaces, including a localized networking or communication capability, thereby allowing the client device 120 to be communicatively coupled to the server 102 over a network 118.

The client device 120 executes various applications, such as an agent application 122, an email client 124, a browser 126, and other applications, services, or processes. The agent application 122 is in communication with various components on the server 102, including the management service 111, thereby providing visibility with respect to the operation status of the client device 120. Where compliance rules 115 are stored locally on the client device 120, the agent application 122 includes a compliance engine for monitoring the activities associated with the client device 120. For such embodiments, the agent application 122 notifies the management service 111 in the server 102 in the event that a non-compliant activity associated with the client device 120 is detected.

The email client 124 is executed to gain access to such data as mailbox data, calendar data, contact data, and so on. Where compliance rules 115 are stored locally on the client device 120, the agent application 122 monitors activities associated with the email client 124, the browser, and other applications installed on the client device 120 to determine whether activities associated with the client device 120 comply with the compliance rules 115.

The client device 120 may include a data store 129 configured to only allow authorized users (e.g., an enterprise administrator) access to data stored within the data store 129. In some implementations, the data store 129 may comprise an encrypted portion of a physical storage device on the client device 120. In some instances, the data store 129 may include an enrollment package 130 obtained by the client device 120 from a command queue and executed to facilitate the provisioning and enrollment process involving the client device 120. In other instances, the enrollment package 130 may be pre-loaded on the client device 120 when the user installs the agent application 122. In this scenario, the pre-loaded enrollment package 130 automatically executes without user interaction once the client device 120 fetches an execute command from a command queue maintained by the server 102.

The enrollment package 130 may be embodied as an unmanaged application program interface (API) 132 compiled to machine-level code and executed directly by the operating system of the client device 120. The data store 129 may also include domain controller settings 134 and user credentials 136 associated with the end user of the client device 120. The domain controller settings 134 are utilized by the enrollment package 130 for configuring the Domain Name System (DNS) settings of a primary network interface of the client device 120 to use the domain controller 121 as the DNS server for the client device 120. The user credentials 136 are utilized by the enrollment package 130 for activate a NetDomainJoin function for joining the client device 120 to the corporate domain, as described in more detail below.

Figure 2:
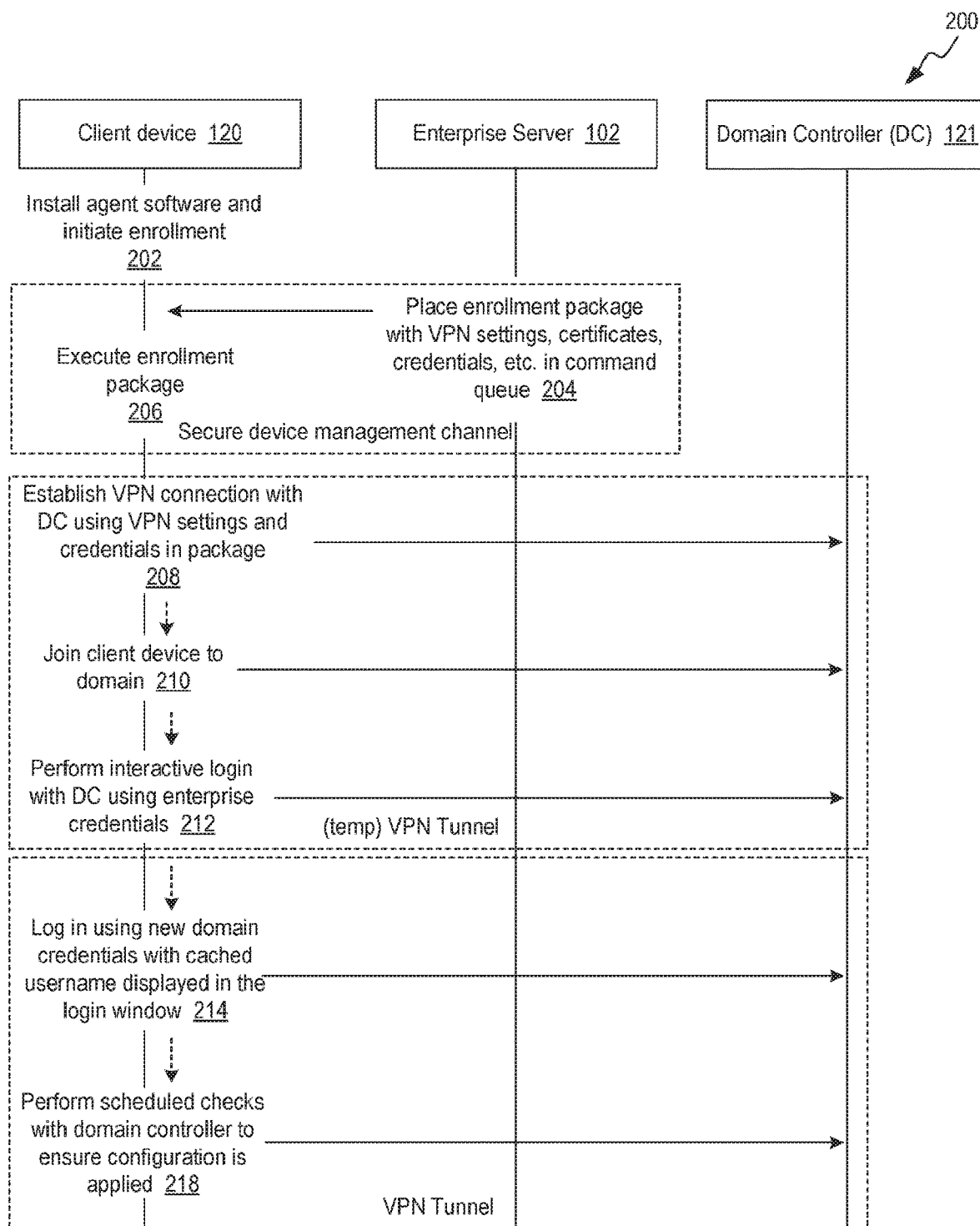
FIG. 2 is a sequence diagram that illustrates the interaction between various components in the networked environment of FIG. 1 in accordance with various embodiments.

Having described various components of the server 102 and the client device 120, reference is now made to FIG. 2, which is a sequence diagram 200 that illustrates the interaction between various components in the networked environment of FIG. 1 for remotely provisioning a client device 120 and joining the client device 120 to the corporate domain. Beginning at step 202, the agent application 122 is installed onto the client device 120. Installation of the agent application 122 may be initiated by clicking on a URL provided by the enterprise administrator, navigating to an IP address, and so on.

At step 204, the enrollment service 116 executing in the server 102 places an enrollment package 130 with VPN settings, certificates, client device 120 credentials, etc. into a command queue associated with the client device 120 being provisioned.

At step 206, the client device 120 retrieves the enrollment package 130 from the command queue maintained by the server 102 and executes the enrollment package 130. In some instances, retrieval of the enrollment package 130, VPN settings, certificates, etc. is conducted over a device management channel established between the server 102 and the client device 120. For example, access to the enrollment package 130, VPN settings, certificates, etc. may be restricted using encryption or other security measures through the device management channel. Furthermore, the management service 111 may be configured to determine whether the client device 120 complies with management policies before placing the enrollment package 130 in the command queue for retrieval by the client device 120.

At step 208, the enrollment package 130 establishes a temporary VPN tunnel connection with the client device and the domain controller 121 using the VPN settings, certificates, credentials obtained earlier by the client device 120. At step 210, the enrollment package 130 changes the DNS settings of the primary network interface of the client device 120 to use the domain controller 121 as the DNS server and then executes a NetDomainJoin function to join the client device 120 to the corporate domain. At that time, an account in the directory service (e.g., active directory (AD)) is established for the client device 120. This serves to bind the client device 120 to the directory service of the organization whereby the directory service maps the names of corporate resources to their respective network addresses within the enterprise network environment.

At step 212, once the new directory service account is established, the enrollment package 130 executes an interactive login session with the domain controller 121 using credentials provided to the client device 120 by the enrollment service 116. In some implementations, the interactive login session is automatically executed by the enrollment package 130 such that no end user interaction is required. During the interactive login session, the credentials (e.g., userid, password) entered by the end user (or by the enrollment package 130) are cached. Once the user's credentials are authenticated by the domain controller 121, a new VPN connection is established.

At step 214, the client device 120 logs into the corporate domain using the cached credentials. At step 218, the enrollment package 130 performs scheduled checks with the domain controller 121 through the VPN to ensure that the network configurations and management policies have been properly applied to the newly provisioned client device 120. Thereafter, the process shown in the sequence diagram of FIG. 2 ends. A technical effect of the sequence described above is the remote provisioning and enrollment by an enterprise administrator of a client device 120 with an on-premises domain controller 121 where the client device 120 is located outside the corporate domain.

Figure 3:
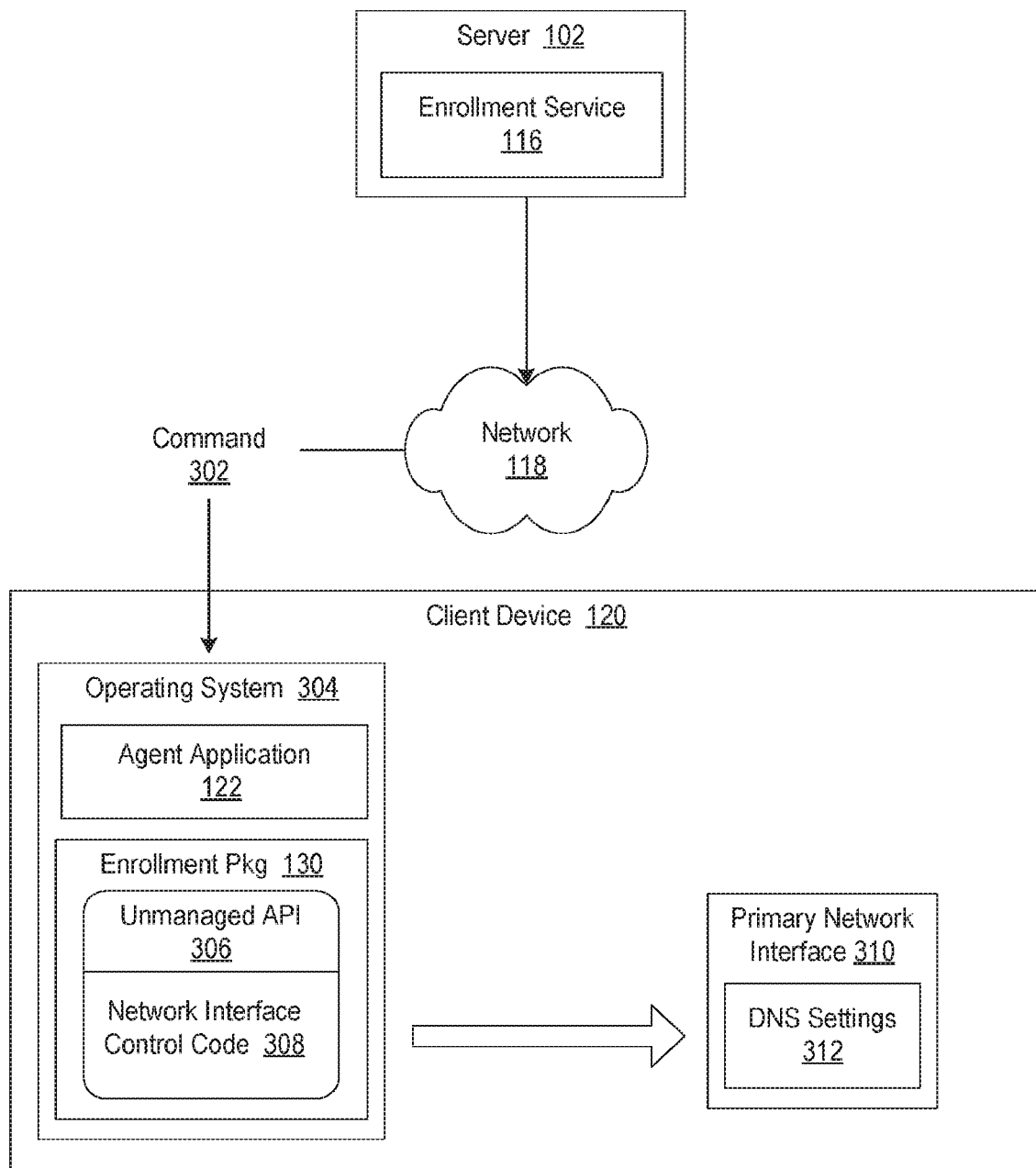
FIG. 3 is a block diagram illustrating the use of unmanaged code to join a client device of FIG. 1 to a domain in accordance with various embodiments.

FIG. 3 is a block diagram providing additional details regarding the use of unmanaged code for facilitating the remote provisioning and enrollment of a client device 120 with an on-premises domain controller 121 without user interaction. As described above, in some instances, the enrollment service 116 executing in the server 102 places an execute command 302 in the command queue that the client device 120 accesses over a network 118. The command 302 initiates execution of the enrollment package 130 in the client device 120 upon being retrieved by the client device 120.

The operating system 304 running on the client device 120 manages both hardware and software resources of the client device 120. The agent application 122 executing on the client device 120 fetches the command 302 and executes the enrollment package 130 in the data store 129 to call a domain join function from the netapi32.dll Windows® API. In some implementations, the enrollment package 130 is developed using the Active Server Pages (ASP).Net 4.0/4.5 web application framework, where the enrollment package 130 may be implemented in such languages as C#, Visual Basic (VB).NET, F#, or other suitable language.

For implementations where the enrollment package 130 is not resident or pre-loaded on the client device 120, the server 102 stores the enrollment package 130 in the command queue maintained by the server 102. The client device 120 then fetches the enrollment package 130 from the command queue. Note that the command queue may be stored within the data store 110 of the server 102 or stored in another remote storage facility. In some implementations, Interop APIs are utilized to call the Windows® Kernel32.dll to invoke a command under the NetDomainJoin function defined by Microsoft®. This particular function is utilized by the unmanaged API 306 to join the client device 120 with the corporate domain and creates an Active Directory (AD) account for the client device 120. The unmanaged API 306 may include network interface control code 308 for interfacing directly with the primary network interface 310 of the client device 120 and changing the DNS settings 312. The primary network interface 310 of the client device 120 manages the wired (e.g., Ethernet) and wireless (e.g., WiFi) connections for coupling to the network 118.

Figure 4:
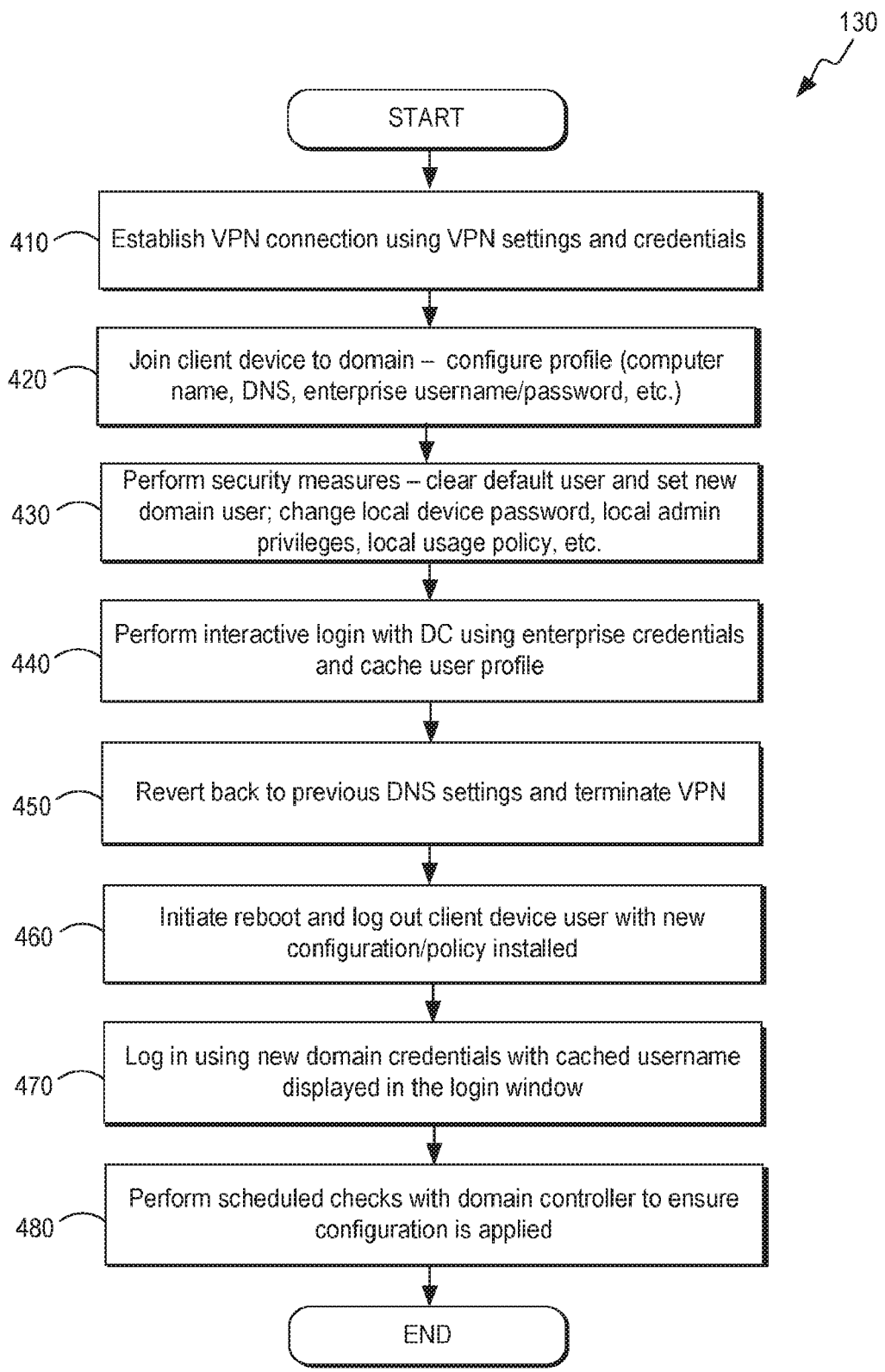
FIG. 4 is a flowchart that illustrates functionality of the enrollment package executing in the client device in FIG. 1 for remotely provisioning and enrolling the client device in accordance with various embodiments.

With reference back to the sequence diagram in FIG. 2, additional details regarding the functionality attributed to the individual components are now provided. Reference is made to FIG. 4, which is a flowchart that illustrates operation of the enrollment package 130 executing in the client device 120. Beginning at step 410, the enrollment package 130 establishes a temporary VPN connection with the client device 120 and the domain controller 121 using the VPN settings, certificates, credentials obtained earlier by the client device 120. At step 420, the enrollment package 130 changes the DNS settings of the primary network interface of the client device 120 to use the domain controller 121 as the DNS sever. The enrollment package 130 also changes the name of the client device 120 to matching the organization's naming convention. The enrollment package 130 then executes a NetDomainJoin function to join the client device 120 to the corporate domain. At that time, an account in the directory service (e.g., active directory (AD)) is established for the client device 120.

At step 430, the enrollment package 130 executing on the client device 120 performs various security measures to control usage of the client device 120 where such security measures may include, for example, changing the local password for accessing the client device 120 and changing local administrator privileges relate to use and operation of the client device 120. Changing of local administrator privileges is performed for purposes of restricting installation of new applications by the end user and for restricting other activities on the client device 120 (e.g., "jailbreaking" a smartphone where software restrictions imposed by the manufacturer are removed).

At step 440, once the new directory service account is established, the enrollment package 130 executes an interactive login session with the domain controller 121 using credentials provided to the client device 120 by the enrollment service 116. In some implementations, the interactive login session is automatically executed by the enrollment package 130 such that no end user interaction is required. During the interactive login session, the credentials (e.g., userid, password) entered by the end user (or by the enrollment package 130) are cached.

At step 450, the enrollment package 130 adds the new domain user to the appropriate local group on the client device 120 and reverts the DNS settings of the primary network interface on the client device 120 back to the previous DNS settings used prior to execution of the enrollment package 130. The temporary VPN tunnel connection is then terminated. At step 460, the enrollment package 130 executing on the client device 120 reboots the client device 120 with the new network configuration installed and management policies implemented.

At step 470, the client device 120 logs into the corporate domain using the cached credentials. At step 480, the enrollment package 130 performs scheduled checks with the domain controller 121 through a new VPN tunnel connection to ensure that the network configurations and management policies have been properly applied to the newly provisioned client device 120. Thereafter, the process shown in FIG. 4 ends.

With regards to the flowchart in FIG. 4, it should be emphasized that the functionality attributed to the various components can be implemented in a single process or application executed by the client device 120 in multiple processes or applications. Furthermore, it should be emphasized that the separation or segmentation of functionality as discussed herein is presented for illustrative purposes only as various functions may be combined or performed concurrently.

The flowchart of FIG. 4 and the sequence diagram of FIG. 2 show examples of the functionality and operation of components described herein. The components described herein can be embodied in hardware, software, or a combination of hardware and software. If embodied in software, each element can represent a module of code or a portion of code that includes program instructions to implement the specified logical function(s). The program instructions can be embodied in the form of, for example, source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

Although the flowchart and sequence diagram show a specific order of execution, it is understood that the order of execution can differ from that which is shown. For example, the order of execution of two or more elements can be switched relative to the order shown. Also, two or more elements shown in succession can be executed concurrently or with partial concurrence. Further, in some examples, one or more of the elements shown in the flowcharts can be skipped or omitted.

The various components described herein can include at least one processing circuit, where such a processing circuit can include, for example, one or more processors and one or more storage devices that are coupled to a local interface. The local interface can include, for example, a data bus with an accompanying address/control bus or any other suitable bus structure.

The one or more storage devices for a processing circuit can store data or components that are executable by the one or more processors of the processing circuit. For example, the components described herein can be stored in one or more storage devices and be executable by one or more processors. Also, a data store, such as the data store 110 in the server 102 and the data store 129 in the client device 120 can be stored in the one or more storage devices.

The various components described herein can be embodied in the form of hardware, as software components that are executable by hardware, or as a combination of software and hardware. If embodied as hardware, the components described herein can be implemented as a circuit or state machine that employs any suitable hardware technology. The hardware technology can include, for example, one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

One or more of the components described herein that include software or program instructions can be embodied in any non-transitory computer-readable medium for use by or in connection with an instruction execution system such as, a processor in a computer system or other system. The computer-readable medium can contain, store, and/or maintain the software or program instructions for use by or in connection with the instruction execution system.

A computer-readable medium can include a physical media, such as, magnetic, optical, semiconductor, and/or other suitable media. Examples of a suitable computer-readable media include, but are not limited to, solid-state drives, magnetic drives, or flash memory. Further, any logic or component described herein can be implemented and structured in a variety of ways. For example, one or more components described can be implemented as modules or components of a single application. Further, one or more components described herein can be executed in one computing device or by using multiple computing devices.

It is emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A method, comprising:
   determining that a client device located outside a corporate domain lacks an application native to an operating system of the client device with a programming interface that supports direct communication with the client device for remotely initiating execution of an application that remotely adds the client device to the corporate domain;
   in response to determining that the client device lacks the application, placing an enrollment application and virtual private network (VPN) settings in a command queue associated with the client device, wherein the enrollment application is configured to:
      establish a VPN connection with a domain controller located within the corporate domain using the VPN settings, the domain controller being configured to process login requests to the corporate domain;
      transmit a request over the VPN connection to the domain controller to join the corporate domain, wherein a corporate account in a directory service is established for the client device;
      configure the corporate account;
      perform an interactive login with the domain controller using credentials of the corporate account;
      in response to a successful interactive login with the domain controller, cache a user profile associated with the corporate account; and
      terminate the VPN connection; and
   transmitting an instruction to the client device to retrieve the enrollment application and the VPN settings from the command queue associated with the client device.

2. The method of claim 1, further comprising:
   receiving a notification from a domain controller within the corporate domain relating to addition of a new directory service account for the client device; and
   in response to the notification, associating the client device with an organizational group for a management service.

3. The method of claim 1, further comprising determining that the client device complies with at least one compliance policy, wherein placing the enrollment application and the VPN settings in the command queue occurs in response to determining that the client devices complies with the at least one compliance policy.

4. The method of claim 1, wherein the enrollment application further comprises authentication certificates for the client device.

5. The method of claim 1, wherein the enrollment application further comprises one or more client device credentials.

6. A system, comprising:
   a computing device comprising a processor and a memory; and
   machine-readable instructions stored in the memory that, when executed by the processor, cause the computing device to at least:
      determine that a client device located outside a corporate domain lacks an application native to an operating system of the client device with a programming interface that supports direct communication with the computing device for remotely initiating execution of an application that remotely adds the client device to the corporate domain;
      in response to a determination that the client device lacks the application, placing an enrollment application and virtual private network (VPN) settings in a command queue associated with the client device, wherein the enrollment application is configured to:
         establish a VPN connection with a domain controller located within the corporate domain using the VPN settings, the domain controller being configured to process login requests to the corporate domain;
         transmit a request over the VPN connection to the domain controller to join the corporate domain, wherein a corporate account in a directory service is established for the client device;
         configure the corporate account;
         perform an interactive login with the domain controller using credentials of the corporate account;
         in response to a successful interactive login with the domain controller, cache a user profile associated with the corporate account; and
         terminate the VPN connection; and
      transmit an instruction to the client device to retrieve the enrollment application and the VPN settings from the command queue associated with the client device.

7. The system of claim 6, wherein the machine-readable instructions, when executed by the processor, further cause the computing device to at least:
   receive a notification from a domain controller within the corporate domain relating to addition of a new directory service account for the client device; and in response to the notification, associate the client device with an organizational group for a management service executing on the computing device.

8. The system of claim 6, wherein the machine-readable instructions, when executed by the processor, further cause the computing device to determine that the client device complies with at least one compliance policy, wherein placement of the enrollment application and the VPN settings in the command queue occurs in response to a determination that the client devices complies with the at least one compliance policy.

9. The system of claim 6, wherein the enrollment application further comprises authentication certificates for the client device.

10. The system of claim 6, wherein the enrollment application further comprises one or more client device credentials.

11. A non-transitory, computer-readable medium comprising machine-readable instructions that, when executed by a processor of a computing device, cause the computing device to at least:

determine that a client device located outside a corporate domain lacks an application native to an operating system of the client device with a programming interface that supports direct communication with the computing device for remotely initiating execution of an application that remotely adds the client device to the corporate domain;

in response to a determination that the client device lacks the application, placing an enrollment application and virtual private network (VPN) settings in a command queue associated with the client device, wherein the enrollment application is configured to:

establish a VPN connection with a domain controller located within the corporate domain using the VPN settings, the domain controller being configured to process login requests to the corporate domain;

transmit a request over the VPN connection to the domain controller to join the corporate domain, wherein a corporate account in a directory service is established for the client device;

configure the corporate account;

perform an interactive login with the domain controller using credentials of the corporate account;

in response to a successful interactive login with the domain controller, cache a user profile associated with the corporate account; and terminate the VPN connection; and transmit an instruction to the client device to retrieve the enrollment application and the VPN settings from the command queue associated with the client device.

12. The non-transitory, computer-readable medium of claim 11, wherein the machine-readable instructions, when executed by the processor, further cause the computing device to at least:

receive a notification from a domain controller within the corporate domain relating to addition of a new directory service account for the client device; and in response to the notification, associate the client device with an organizational group for a management service executing on the computing device.

13. The non-transitory, computer-readable medium of claim 11, wherein the machine-readable instructions, when executed by the processor, further cause the computing device to determine that the client device complies with at least one compliance policy, wherein placement of the enrollment application and the VPN settings in the command queue occurs in response to a determination that the client devices complies with the at least one compliance policy.

14. The non-transitory, computer-readable medium of claim 11, wherein the machine-readable instructions, when executed by the processor, further cause the computing device to establish a VPN connection between the client device and a domain controller, wherein the VPN connection is based at least in part on the VPN settings placed in the command queue.

15. The non-transitory, computer-readable medium of claim 11, wherein the enrollment application further comprises authentication certificates for the client device.

16. The method of claim 1, further comprising establishing a VPN connection between the client device and the domain controller, wherein the VPN connection is based at least in part on the VPN settings placed in the command queue.

17. The system of claim 6, wherein the machine-readable instructions, when executed by the computing device, further cause the computing device to at least establish a VPN connection between the client device and a domain controller, wherein the VPN connection is based at least in part on the VPN settings placed in the command queue.

* * * * *